(12) United States Patent  
Whitehead et al.

(10) Patent No.: US 7,025,384 B2
(45) Date of Patent: Apr. 11, 2006

(54) APPARATUS AND METHOD FOR SECURING A TUBULAR LINER IN A COMPOSITE PIPE

(75) Inventors: Justin M. Whitehead, Katy, TX (US); Gary L. Galle, Houston, TX (US); Karl A. Parfrey, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 10/284,650

(22) Filed: Oct. 31, 2002

(65) Prior Publication Data

US 2003/0047939 A1 Mar. 13, 2003

Related U.S. Application Data

(63) Continuation-in-part of application No. 09/657,824, filed on Sep. 8, 2000, now abandoned.

(51) Int. Cl.
*F16L 55/00* (2006.01)

(52) U.S. Cl. .......................... 285/55; 285/251; 285/247

(58) Field of Classification Search ................. 285/55, 285/148.12, 148.13, 148.17, 222, 222.1–222.5, 285/258, 245, 382.4, 334.5, 251, 248, 247, 285/249
See application file for complete search history.

(56) References Cited

U.S. PATENT DOCUMENTS

| 1,175,532 | A | * | 3/1916 | Lambkin | 285/249 |
|---|---|---|---|---|---|
| 2,234,350 | A | | 3/1941 | Muller | |
| 2,441,718 | A | * | 5/1948 | Parker et al. | 285/222.4 |
| 2,485,975 | A | * | 10/1949 | Main, Jr. | 285/222.1 |
| 2,535,460 | A | * | 12/1950 | Rotter et al. | 285/222.4 |
| 2,550,583 | A | * | 4/1951 | Millar | 285/258 |
| 2,733,940 | A | * | 2/1956 | Millar | 285/222.4 |
| 2,750,210 | A | * | 6/1956 | Trogdon et al. | 285/222.4 |
| 3,008,736 | A | * | 11/1961 | Samiran | 285/222.5 |
| 3,140,106 | A | * | 7/1964 | Thomas et al. | 285/256 |
| 4,437,689 | A | * | 3/1984 | Goebel et al. | 285/246 |
| 4,660,867 | A | * | 4/1987 | Kemper et al. | 285/256 |
| 4,729,583 | A | * | 3/1988 | Lalikos et al. | 285/256 |
| 4,813,715 | A | | 3/1989 | Policelli | |
| 4,887,847 | A | * | 12/1989 | Barnoach | 285/55 |
| 5,255,944 | A | * | 10/1993 | Blin et al. | 285/222.2 |
| 5,332,049 | A | | 7/1994 | Tew | |
| 5,771,975 | A | | 6/1998 | Anderson et al. | |
| 5,813,467 | A | | 9/1998 | Anderson et al. | |
| 6,364,368 | B1 | * | 4/2002 | Kilgore | 285/251 |

* cited by examiner

*Primary Examiner*—Aaron Dunwoody
(74) *Attorney, Agent, or Firm*—Bracewell & Giuliani LLP

(57) ABSTRACT

A device for mechanically securing a tubular liner in a pipe having a tubular member and connectors on each end. The connector has a bore with an internal seat that may have grooves and be tapered depending upon the application. The liner extends through the tubular member into the bore. The ends of the liner are radially and plastically deformed into engagement with the seats. An inner ring is positioned inside the liner to retain the end of the liner in engagement with the seat. The inner ring may be held by threads or by radially and plastically deforming it. The connectors are mounted to the tubular member independently of the liner, such as by adhesive. The liner may be replaced by removing the inner rings without affecting the connection between the tubular member and the connectors.

4 Claims, 6 Drawing Sheets

Fig. 1
Fig. 2
Fig. 3
Fig. 4
Fig. 5
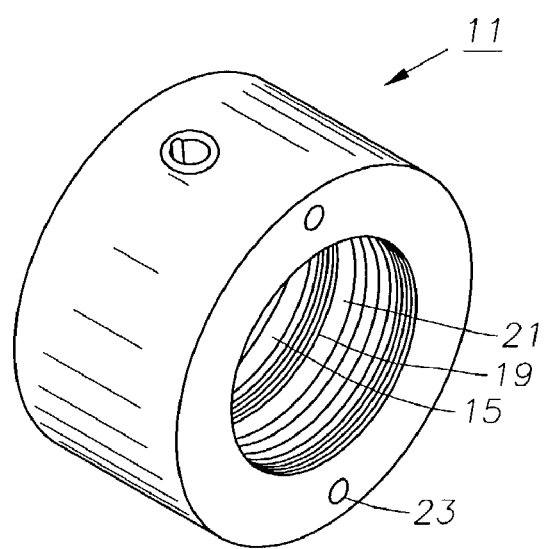
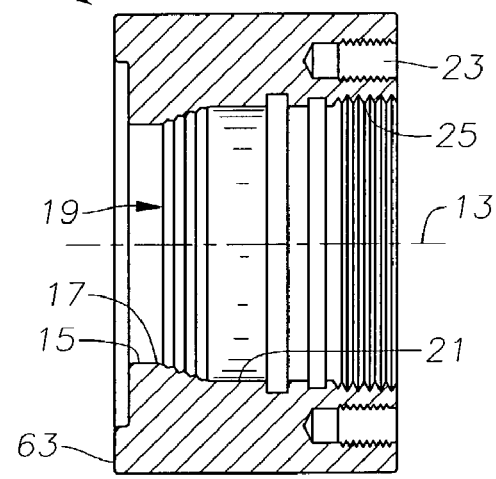
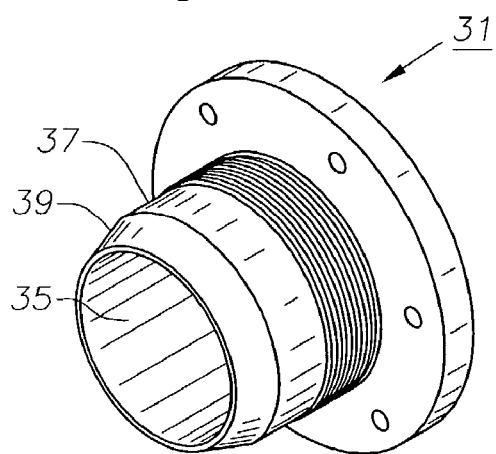
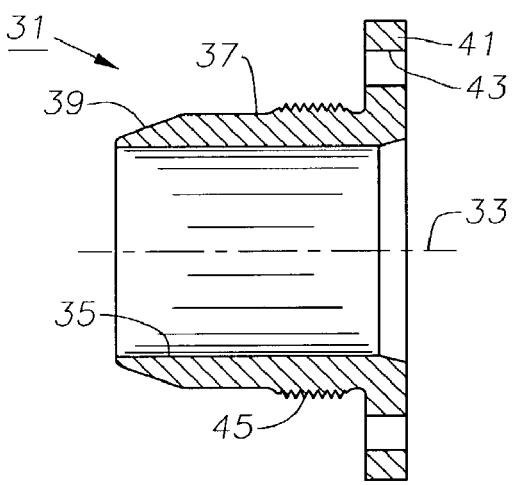
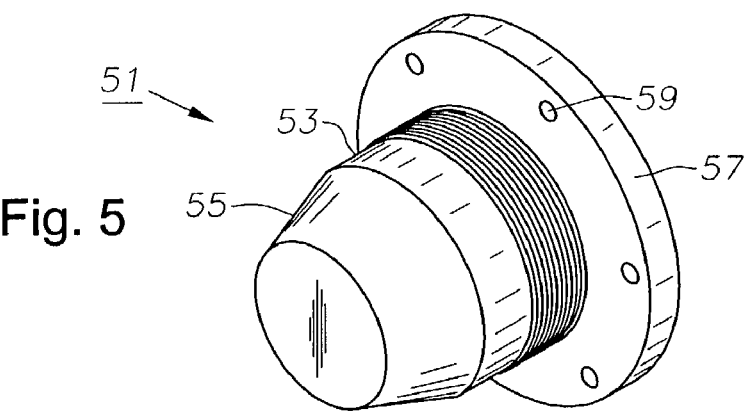

APPARATUS AND METHOD FOR SECURING A TUBULAR LINER IN A COMPOSITE PIPE

CROSS-REFERENCE TO RELATED APPLICATION

This application is a continuation-in-part of application Ser. No. 09/657,824, filed Sep. 8, 2000, abandoned.

BACKGROUND OF THE INVENTION

1. Technical Field

The present invention relates in general to an improved riser pipe for offshore fluid operations, and in particular to an improved apparatus and method for forming composite pipe structures. Still more particularly, the present invention relates to an improved apparatus and method for securing tubular liners inside composite riser pipes for offshore fluid operations.

2. Description of the Prior Art

Tubular liners for pipes are fairly well known in the prior art. For example, in FIG. 1 of U.S. Pat. No. 4,813,715, a tubular liner 18 is located within a composite drill pipe 10. Each axial end of liner 18 is secured to the ends of drill pipe 10 with a metal connector 30. Another example is illustrated in FIG. 3 of U.S. Pat. No. 5,332,049, wherein a rubber liner 38 is bonded to the interior surface of a composite pipe 34. The ends of liner 38 are secured to pipe 34 with metal connectors 28, 30. In each example, the liners protect the interior surfaces of the composite pipes from pressurized drilling mud and/or other environmental concerns that could damage the non-metallic materials used in the pipes.

Prior art liners for composite pipes are typically bonded to the metal end fittings and/or composite tube of the pipe to form seals. However, adhesives for sealing liners to composite tubes are very sensitive to the manufacturing process. As a result, bonded liners may not be sufficiently reliable for oilfield applications. Moreover, when a liner is bonded, it is permanent and not capable of being reused. Bonded liners also require greater care and assembly time in order to cure the adhesive. Furthermore, the material that is used to form the liner can limit the ability of the liner to form a strong, reliable adhesive bond to the composite pipe and metal end fittings. Thus, an improved apparatus and method for joining liners to composite pipes with metal end fittings is needed to overcome the problems and limitations of the prior art.

SUMMARY OF THE INVENTION

In this invention, the pipe assembly has a tubular member with connectors joined to each end. The connectors serve to connect the pipe assembly to other pipes and are preferably secured to the pipe assembly by adhesive. The connector has a bore with an internal seat. Optionally, the seat may contain axial grooves and may be tapered depending upon the application. The liner inserts through the tubular member, and the ends of the liner are radially deformed against the seats. An inner ring is positioned within the liner to retain the ends of the liner in engagement with the seats. The inner ring may be secured by threads in the bore of the connector in one embodiment. The inner ring may also be radially and plastically deformed into engagement with the seats. In one version of the invention, a flaring tool is used to flare the axial ends of the liner prior to assembly.

BRIEF DESCRIPTION OF THE DRAWINGS

FIG. 1 is an isometric schematic view of a connector constructed in accordance with a first embodiment of the present invention.

FIG. 2 is a sectional side view of the connector of FIG. 1.

FIG. 3 is an isometric view of an inner ring constructed in accordance with the first embodiment of the present invention.

FIG. 4 is a sectional side view of the inner ring of FIG. 3.

FIG. 5 is an isometric view of a flaring tool utilized in the method of assembling the first embodiment of the present invention.

DESCRIPTION OF THE PREFERRED EMBODIMENT

Figure 6:
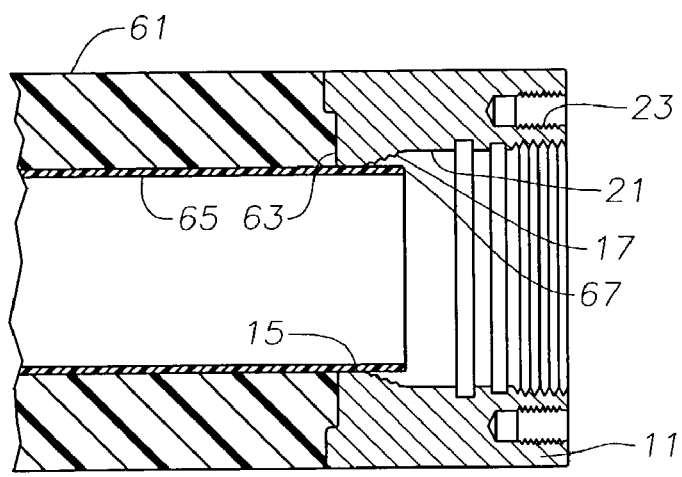
FIG. 6 is a schematic sectional side view of the method of the first embodiment of the present invention at an initial stage of assembly.

Referring to FIGS. 1 and 2, an outer ring or connector 11 for use in a first embodiment of the present invention is shown. Connector 11 is shown schematically as a test or prototype unit. Connector 11 is a hollow, metal, tubular member having an axis 13 and a bore of varying diameter. The rearward portion 15 of the bore is generally cylindrical, and a seat 17 adjoins and is forward of rearward bore portion 15. Seat 17 is tapered or inclined at approximately 20 degrees relative to axis 13 and diminishes in diameter from right to left.

Seat 17 may optionally have a series of internal, axial teeth or grooves 19. In the preferred embodiment, grooves 19 are circumferential, parallel to one another, and do not form a helical thread. The bore of connector 11 transitions from seat 17 into a generally cylindrical segment 21, to the right or forward of grooves 19. A set of threads 25 are formed forward of cylindrical segment 21. The main body of connector 11 has a set of tapped holes 23 in its right side face that are parallel to axis 13. Holes 23 are employed for test purposes and not utilized in commercial or production units. Also, in commercial units, the open end of connector 11 is spaced further from threads 25 and a second set of threads (not shown) is located between threads 25 and the open end. The second set of threads enables connector 11 to be connected to other pipe assemblies.

As shown in FIGS. 3 and 4, an inner ring 31 comprises a separate element from connector 11. Like connector 11, inner ring 31 is a hollow, metal, tubular member having an axis 33 and a bore 35. However, inner ring 31 is smaller in diameter than connector 11 such that inner ring 31 can fit within the bore of connector 11, as will be described below. Bore 35 and the outer or retaining surface 37 of inner ring 31 are generally cylindrical, but outer surface 37 has a short, 20 degree taper 39 on its left side edge that diminishes in diameter from right to left. Taper 39 is a smooth conical surface in the preferred embodiment. An annular flange 41 is shown extending from the right side edge of inner ring 31. Flange 41 is used for test fixture purposes and is eliminated in production inner rings 31. Flange 41 has a set of through-holes 43 that are parallel to axis 33. Inner ring 31 also has external threads 45 on its outer surface 37.

Referring now to FIG. 5, a flaring tool 51 that is utilized in a method of assembling the first embodiment of the present invention is shown. Flaring tool 51 is similar in size and geometry relative to inner ring 31, except that it is a bull-nosed solid member rather than hollow. Like inner ring 31, flaring tool 51 has a cylindrical outer surface 53 with a 20 degree taper 55 on its left side edge, and a flange 57 with holes 59. However, taper 55 has a greater axial dimension than taper 39 on inner ring 31.

In operation, the previously described elements of the first embodiment are used to secure a liner in a pipe having connectors on each end. FIG. 6 schematically depicts components of a drilling or production riser, which include a fiber and resin composite tubular member 61 that has each end (only one shown) joined to connector 11. Connector 11 has a bonding surface 63 to which an end of tubular member 61 is adhesively secured axially in an end-to-end interface. FIG. 6 depicts a test unit, and in the actual production unit, a sleeve portion (not shown) of connector 11 extends rearwardly and receives a forward portion of the end of tubular member 61. Tubular member 61 is also adhesive bonded between its outer diameter and the inner diameter of rearward extending sleeve portion.

A thin wall tubular liner 65 of elastomeric material is located within tubular member 61. Liner 65 is precisely sized to be closely received by the internal diameter of tubular member 61. At the initial phase of assembly shown in FIG. 6, liner 65 has an axial length that exceeds the axial length of tubular member 61. Hence, an end portion 67 of liner 65 extends beyond each axial end of tubular member 61 and into the bore of each connector 11. End portion 67 extends through entry bore portion 15 and seat 17, but not into cylindrical segment 21 of connector 11.

Figure 7:
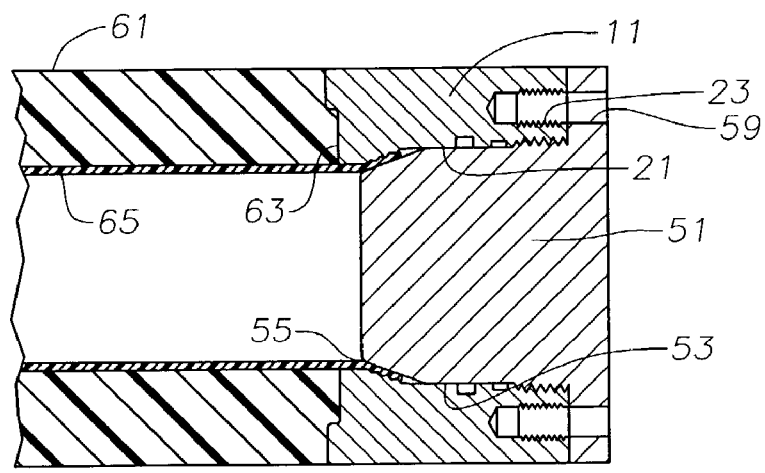
FIG. 7 is a schematic sectional side view of the method of the first embodiment of the present invention at a second stage of assembly.
Figure 8:
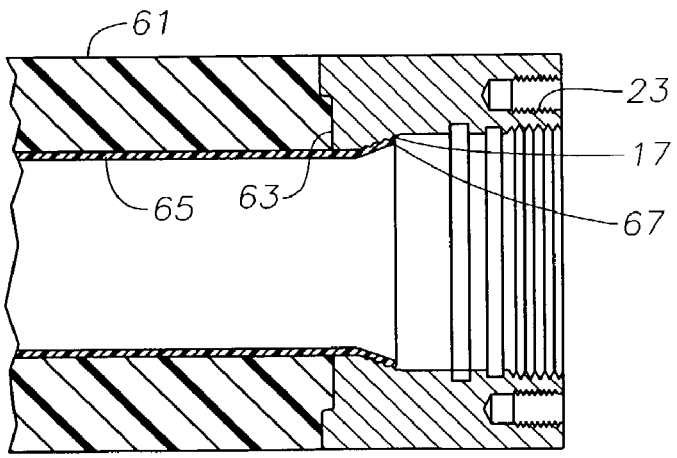
FIG. 8 is a schematic sectional side view of the method of the first embodiment of the present invention at a third stage of assembly.

In the next step of the first embodiment (FIG. 7), flaring tool 51 is inserted into each axial end of the assembly to plastically deform end portions 67 of liner 65 into frustoconical flares (FIG. 8). The flaring tool 51 is preferably heated to 200–250 degrees F. prior to flaring. The taper 55 on flaring tool 51 engages end portion 67 and defects it outward into the inclined profile of seat 17. During this operation, outer surface 53 of flaring tool 51 is closely received by cylindrical segment 21 of connector 11 to prevent excessive movement therebetween. If necessary to effect the flares, flaring tool 51 may be temporarily secured to connector 11 by inserting threaded fasteners (not shown) into holes 59, 23. Liner 65 is sufficiently restrained during this operation to prevent incidental movement relative to the overall assembly. After end portions 67 are formed into the permanent flares, flaring tool 51 is removed from connector 11 (FIG. 8) for completion of the assembly.

Figure 9:
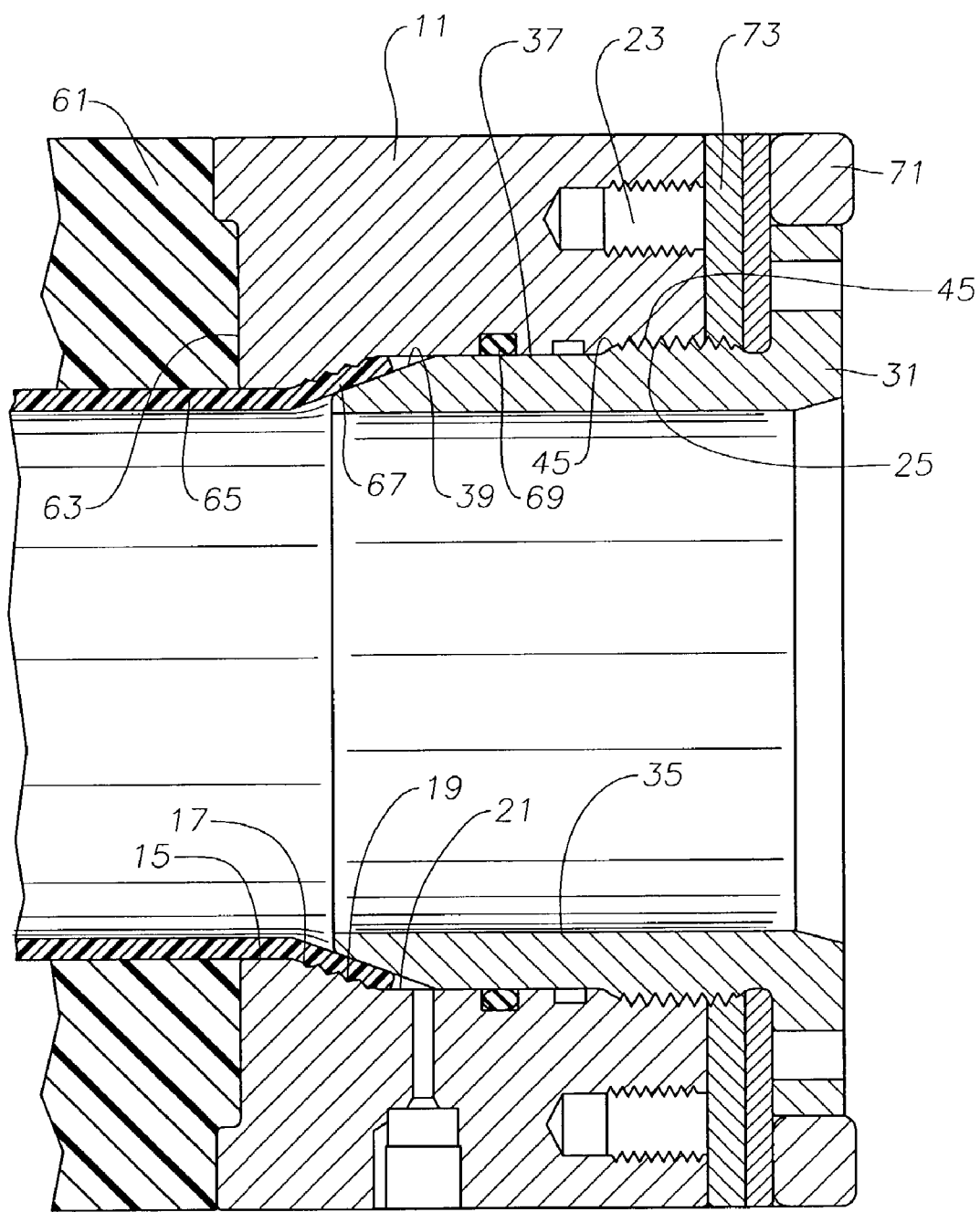
FIG. 9 is an enlarged, schematic, sectional side view of the first embodiment of the present invention after final assembly.

In the final step of the first embodiment (FIG. 9), inner ring 31 is inserted into connector 11 as shown with a sealing O-ring 69 therebetween. Various spacer rings 71 and shims 73 are shown in FIG. 9 as they form a part of a test fixture. Such are not used in production pipe assemblies. External threads 45 on the outer shoulder of inner ring 31 abut internal threads 25 on the internal shoulder of connector 11. The taper 39 on inner ring 31 forces the outer surface of the flared end portion 67 into the internal grooves 19 of connector 11. Grooves 19 serve as retaining surface and provide enhanced grip on liner 65 between connector 11 and inner ring 31. Threads 45 on inner ring 31 engage internal threads 25 in connector 11 to retain inner ring 31 with connector 11. Thus, each axial end of liner 65 is securely restrained within the assembly of tubular member 61 and connector 11 to prevent movement therebetween.

Liner 65 is replaceable since it is merely flared and not bonded to the assembly. It is replaced by unscrewing each inner ring 31, then gripping liner 65 and pulling it from tubular member 61. The bonding between tubular member 61 and connector 11 remains undisturbed during the removal and replacement of liner 65.

Figure 10:
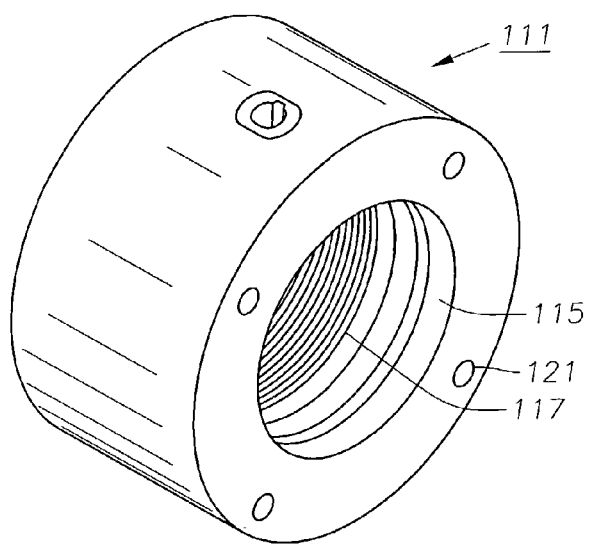
FIG. 10 is an isometric schematic view of a connector constructed in accordance with a second embodiment of the present invention.
Figure 11:
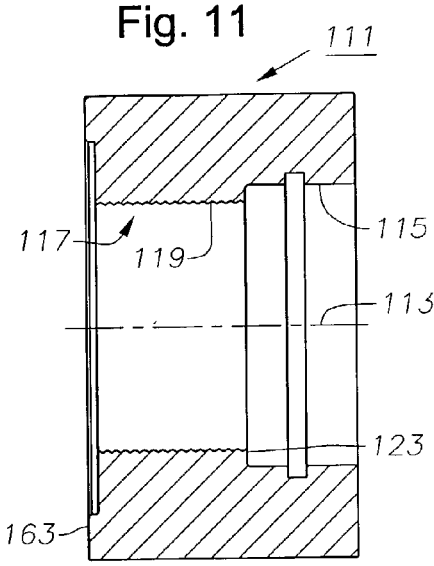
FIG. 11 is a sectional side view of the connector of FIG. 10.

Referring now to FIGS. 10 and 11, a test prototype of a connector 111 for use in a second embodiment of the present invention is shown. Connector 111 is a hollow, metal, tubular member having an axis 113 and a generally smooth, cylindrical bore portion 115 on a right side. A cylindrical seat 117 adjoins the left side of bore 115. Seat 117 is slightly smaller in diameter than bore 115 and optionally may have a series of internal, axial teeth or grooves 119. In the preferred embodiment, grooves 119 are parallel to one another and do not form a helical thread. The main body of connector 111 has a set of tapped holes 121 (FIG. 10) in its right side face that are parallel to axis 113. Holes 121 are used for test purposes, not in production models. Connector 111 has an internal shoulder 123 located between bore 115 and seat 117. In the commercial version of connector 111 (not shown), threads are located in the bore of connector 111 for connecting it to other pipe assemblies.

Figure 12:
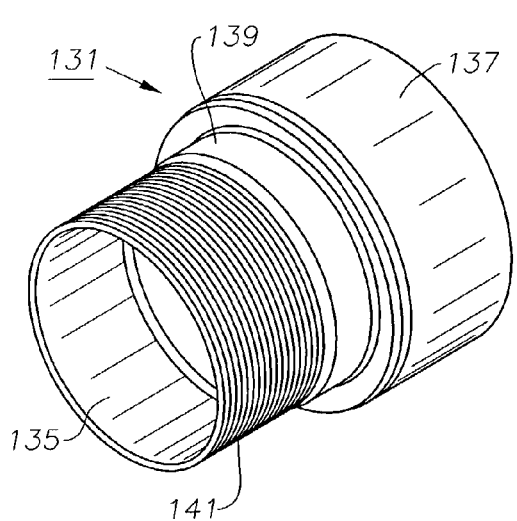
FIG. 12 is an isometric schematic view of an inner ring constructed in accordance with the second embodiment of the present invention.
Figure 13:
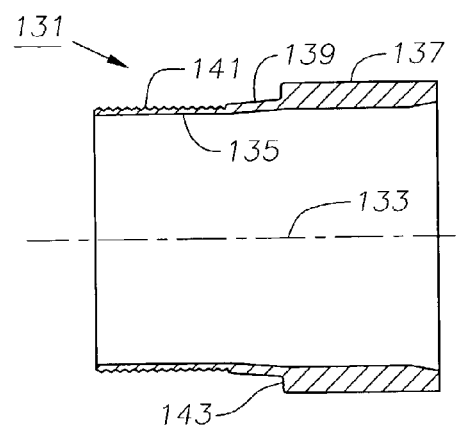
FIG. 13 is a sectional side view of the inner ring of FIG. 12.

As shown in FIGS. 12 and 13, an inner ring 131 comprises a second element of the second embodiment of the invention. Like connector 111, inner ring 131 is a hollow, metal, tubular member having an axis 133 and a generally cylindrical bore 135. However, inner ring 131 is smaller in diameter and shorter in length than connector 111 such that inner ring 131 can fit wholly within the bores 115, 117 of connector 111, as will be described below. Bore 135 and the outer surface 137 of inner ring 131 are generally cylindrical, except for an outer tapered surface 139 near its midsection that diminishes in diameter from right to left. Taper 139 could be replaced by a cylindrical surface. A series of axial teeth or grooves 141 that are complementary in profile to grooves 119 in connector 111 may optionally be located to the left of taper 139. Inner ring 131 also has an outer shoulder 143 located between outer surface 137 and taper 139. Outer shoulder 143 is utilized in the test fixture model of FIG. 17, but could be eliminated.

Figure 14:
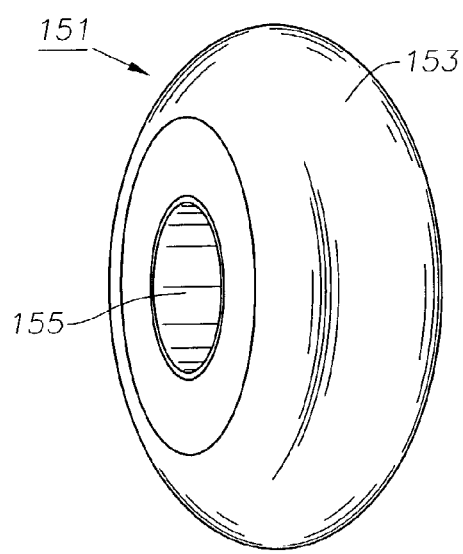
FIG. 14 is an isometric view of a raming mandrel utilized in the method of assembling the second embodiment of the present invention.
Figure 15:
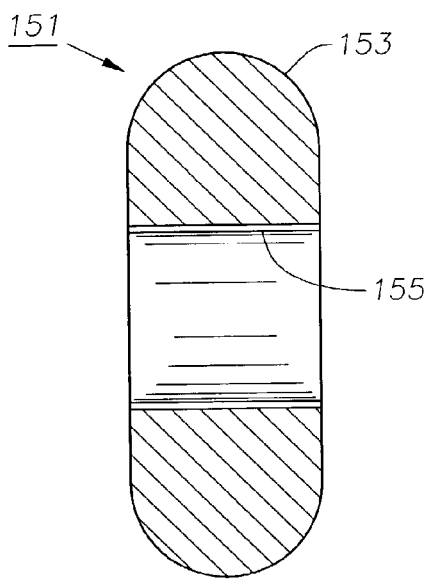
FIG. 15 is a sectional side view of the raming mandrel of FIG. 14.

Referring now to FIGS. 14 and 15, a hardened ramming mandrel 151 that is utilized in a method of assembling the second embodiment of the present invention is shown.

Ramming mandrel 151 is essentially toroidal or donut-like in shape. Ramming mandrel 151 has a rounded outer surface 153 with a maximum diameter that is slightly greater than the minimum inner diameter of inner ring 131. Ramming mandrel 151 also has an axial through hole 155. A mandrel with an expandable annular collet could be used as an alternative to ramming mandrel 151.

A composite fiber and resin tubular member 161 has opposite ends permanently secured to connector 111. Connector 111 has a bonding surface 163 that is permanently mounted to an axial end of tubular member 161. The bonding is preferably by adhesive. In the commercial model (not shown) for a production riser pipe, rather than the test prototype shown in FIG. 17, connector 111 has a rearward extending sleeve over which the end of tubular member 161 extends. The bonding surface in the commercial version is thus the outer diameter of this sleeve portion and an inner diameter of tubular member 161 near its end.

Figure 17:
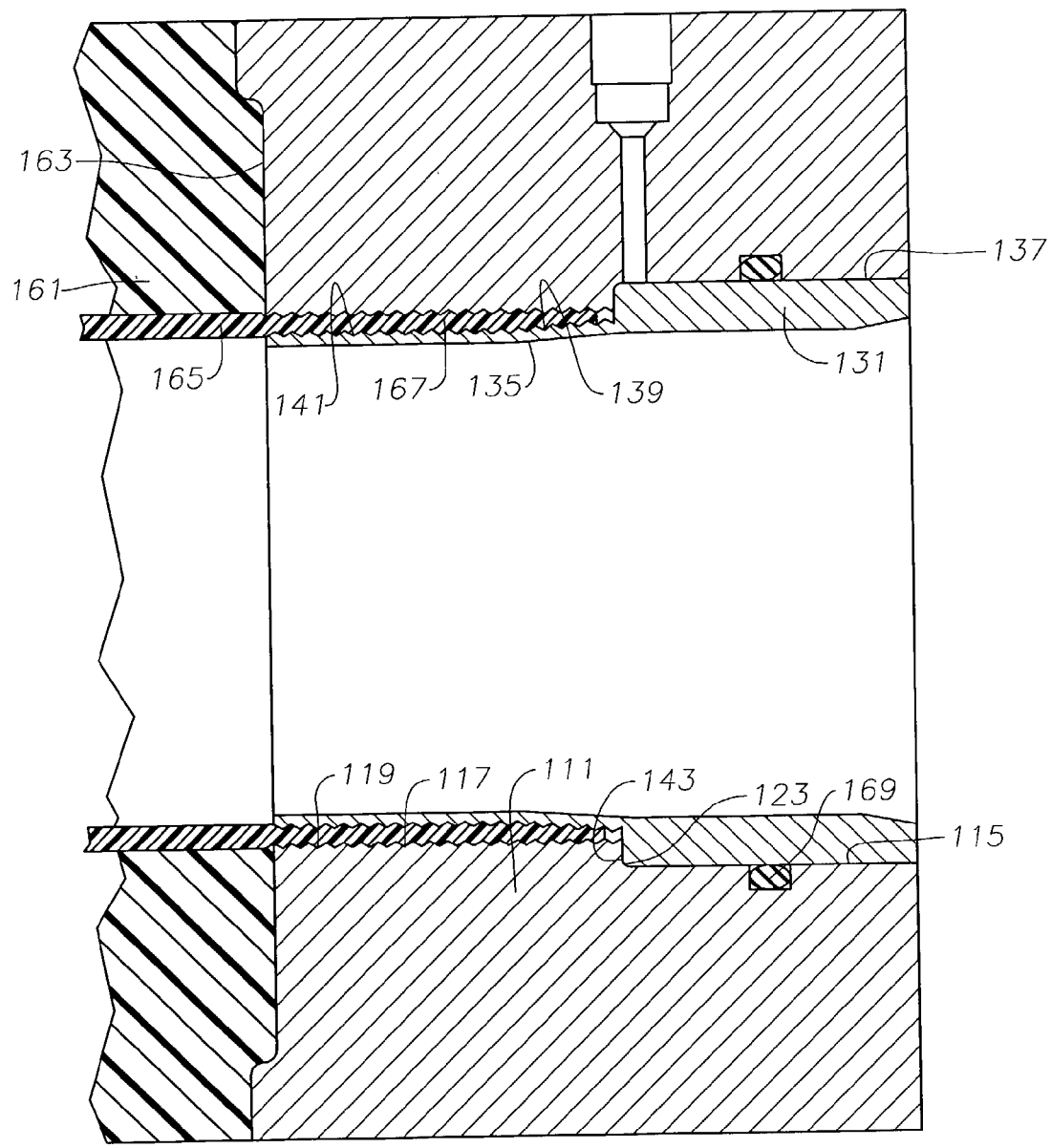
FIG. 17 is an enlarged, schematic, sectional side view of the second embodiment of the present invention after final assembly.

As shown in FIG. 17, an elastomeric liner 165 is inserted into tubular member 161. Liner 165 has an axial length that exceeds the axial length of tubular member 161. Hence, the end portions 167 of liner 165 extend beyond each axial end of tubular member 161 and into connector 111. Liner end portion 167 extends through seat 117, but not into cylindrical bore 115 of connector 111. Inner ring 131 is located within connector 111, and may have an optional O-ring 169 for providing a seal therebetween. Outer shoulder 143 on inner ring 131 abuts inner shoulder 123 in connector 111 in this test fixture version.

Figure 16:
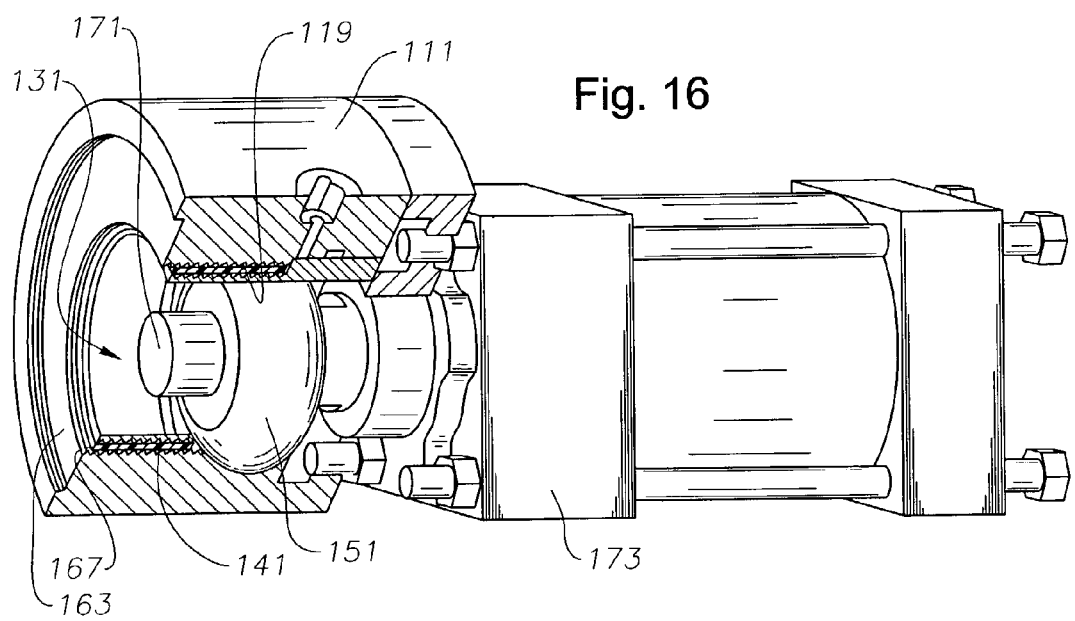
FIG. 16 is a partially-sectioned, isometric view of the method of the second embodiment of the present invention during assembly.

In the next step of the second embodiment (FIG. 16), ramming mandrel 151 is mounted to the shaft 171 of a press 173 and forced into the bore 135 of inner ring 131 as shown. Connector 111, inner ring 131, tubular member 161 and liner 165 are secured from extraneous movement. For ease of understanding, some of these elements are not shown in FIG. 16. The oversized diameter of ramming mandrel 151 is readily received on the larger right side of inner ring 131. However, as the ramming mandrel 151 moves toward the smaller diameter left side of bore 135, end portion 167 of liner 165 is plastically deformed between and into grooves 119 and 141 of connector 111 and inner ring 131, respectively. Inner ring 131 is also plastically or permanently deformed radially outward simultaneously. Grooves 119, 141 provide enhanced grip on liner 165 between connector 111 and inner ring 131. The hoop strength of inner ring 131 retains the ends of liner 165 in engagement with the retaining surface of seat 117. Thus, each axial end of liner 165 is securely restrained within the assembly of tubular member 161 and connectors 111 to prevent movement therebetween. After end portion 167 is deformed, raming mandrel 151 is removed from inner ring 131 (FIG. 17) to complete the assembly.

Liner 165 may be replaced by cutting inner ring 131 with a tool and pulling it from connector 111. Then liner 165 may be gripped and pulled from tubular member 161.

The present invention has several advantages including the ability to effect a reliable engagement between a liner and a composite tubular with metal end connectors. The invention may be utilized in drilling risers, production risers, choke and kill lines, and other applications. The liner may be replaced with other liners without affecting the connection between the tubular member and the connectors. . The liner may be reusable as it may be installed without the use of adhesives.

While the present invention has been shown or described in only some of its forms, it should be apparent to those skilled in the art that it is not so limited, but is susceptible to various changes without departing from the scope of the invention. For example, although grooves are shown on the seats, these may be eliminated. If the frictional engagement is sufficient, grooves on the inner ring of the second embodiment may be eliminated.

What is claimed is:

1. A pipe assembly, comprising in combination:
   a tubular member of composite material having a bore and an axial end;
   a metal connector mounted to the axial end of the tubular member for connecting to other of the pipe assemblies, the connector having a bonding surface to which the tubular member is adhesively bonded, the connector having an open end and a bore containing a seat with a retaining surface;
   an elastomeric liner extending through the bore of the tubular member into the connector, the liner having an end portion that protrudes past the end of the tubular member and has an inner diameter in direct contact with the seat; and
   an inner ring separate from the connector that is wholly located within the bore of the connector, the inner ring having an outer diameter with a retaining surface in direct contact with an inner diameter of the end portion of the liner and deforming the end portion of the liner against the seat of the connector, the inner ring and the liner being free of adhesive bonding to the tubular member to enable the liner to be removed without disturbing the adhesive bonding of the tubular member to the connector.

2. The pipe assembly according to claim 1, wherein the portion of the inner ring having the retaining surface is plastically deformed against the end portion of the liner.

3. The pipe assembly of claim 1, wherein the seat is located within a recess formed in the bore of the connector.

4. A pipe assembly, comprising in combination:
   a tubular member of composite material having a bore and an axial end;
   a metal connector mounted to the axial end of the tubular member for connecting to other of the pipe assemblies, the connector having a bonding surface to which the tubular member is adhesively bonded, the connector having an open end and a bore containing an integrally formed seat with a retaining surface;
   an elastomeric liner extending through the bore of the tubular member into the connector, the liner having an end portion that protrudes past the end of the tubular member and has an outer diameter portion in direct contact with the retaining surface of the seat;
   an inner ring separate from the connector that is wholly located within the bore of the connector, the inner ring having an outer diameter with a retaining surface in direct contact with an inner diameter of the end portion of the liner, the retaining surface of the inner ring deforming the end portion of the liner against the retaining surface of the seat, the inner ring and the liner being free of any adhesive bonding to the tubular member and the connector to enable the liner to be removed from the connector and the tubular member without disturbing the adhesive bonding therebetween; and
   at least one of the retaining surfaces having a plurality of grooves thereon.

\* \* \* \* \*